(12) United States Patent
Yonezawa et al.

(10) Patent No.: US 10,191,211 B2
(45) Date of Patent: Jan. 29, 2019

(54) DISPLAY APPARATUS AND METHOD OF MANUFACTURING THE DISPLAY APPARATUS

(71) Applicant: Sakai Display Products Corporation, Sakai-shi, Osaka (JP)

(72) Inventors: Nobuhiro Yonezawa, Sakai (JP); Takashi Iwaki, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/554,682

(22) PCT Filed: Mar. 2, 2015

(86) PCT No.: PCT/JP2015/056080
§ 371 (c)(1),
(2) Date: Aug. 30, 2017

(87) PCT Pub. No.: WO2016/139718
PCT Pub. Date: Sep. 9, 2016

(65) Prior Publication Data
US 2018/0039015 A1 Feb. 8, 2018

(51) Int. Cl.
*F21V 8/00* (2006.01)
*G02F 1/1335* (2006.01)
(Continued)

(52) U.S. Cl.
CPC ............ *G02B 6/0088* (2013.01); *B32B 37/02* (2013.01); *G02B 6/005* (2013.01); *G02B 6/0051* (2013.01);
(Continued)

(58) Field of Classification Search
CPC ... G02F 2001/133317; G02F 1/133308; B32B 17/064; B32B 2457/202; B32B 37/24;
(Continued)

(56) References Cited

U.S. PATENT DOCUMENTS

2007/0139583 A1 6/2007 Meijers et al.
2012/0092580 A1* 4/2012 Dighde .................. G06F 3/0412
349/58
2012/0140521 A1 6/2012 Kao et al.

FOREIGN PATENT DOCUMENTS

| JP | H9-96800 A | 4/1997 |
| JP | 2007-232809 A | 9/2007 |
| JP | 2012-118498 A | 6/2012 |

\* cited by examiner

*Primary Examiner* — Laura Gudorf
(74) *Attorney, Agent, or Firm* — Bret E. Field; Bozicevic, Field & Francis LLP

(57) ABSTRACT

A display apparatus comprises: a display panel which displays an image on one surface thereof, a light guide plate disposed to face the other surface of the display panel; a plurality of optical sheets interposed between the display panel and the light guide plate; and a spacer which is sandwiched between the display panel and the light guide plate to secure a space for interposing the optical sheets therebetween, wherein the spacer has a space holding layer fixed to the light guide plate and securing the space, and a fixed layer sandwiched between the display panel and the space holding layer and fixed to the display panel, wherein the thickness of the space holding layer is thicker than a total of the thicknesses of the plurality of optical sheets except for an optical sheet nearest to the display panel.

7 Claims, 11 Drawing Sheets

(51) Int. Cl.
  *B32B 37/02* (2006.01)
  *B32B 17/06* (2006.01)
  *B32B 37/24* (2006.01)
  *G02F 1/1333* (2006.01)

(52) U.S. Cl.
  CPC .......... *G02B 6/0065* (2013.01); *B32B 17/064* (2013.01); *B32B 37/24* (2013.01); *B32B 2037/243* (2013.01); *B32B 2310/0831* (2013.01); *B32B 2457/202* (2013.01); *G02F 1/133308* (2013.01); *G02F 1/133615* (2013.01); *G02F 2001/133317* (2013.01)

(58) Field of Classification Search
  CPC .... G02B 6/005; G02B 6/0051; G02B 6/0065; G02B 6/0088
  See application file for complete search history.

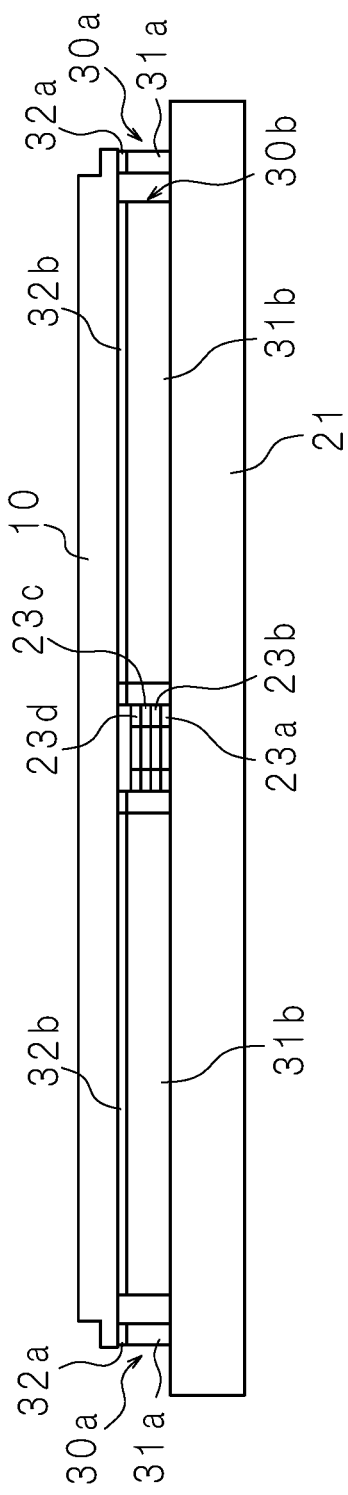

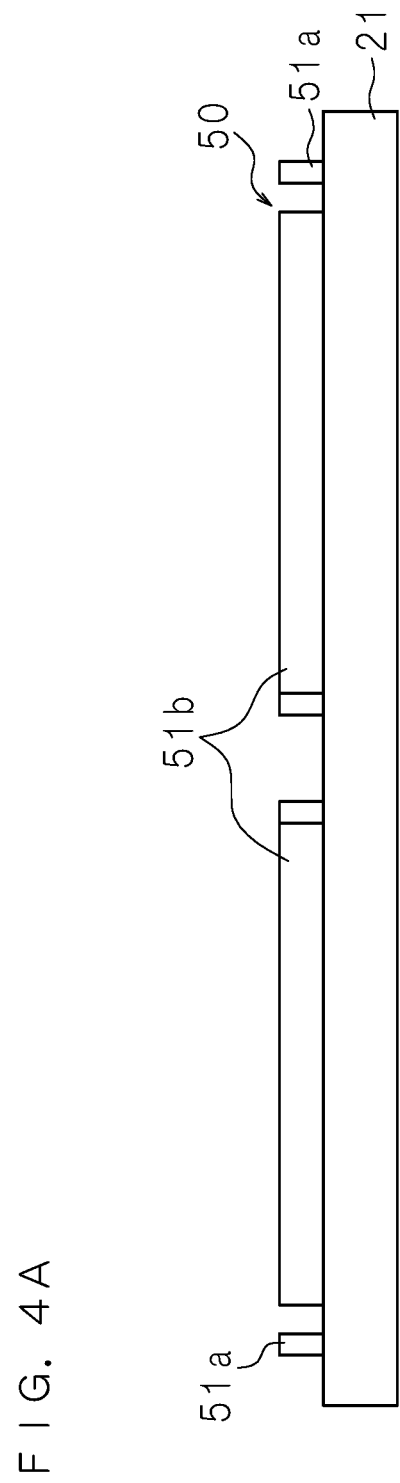

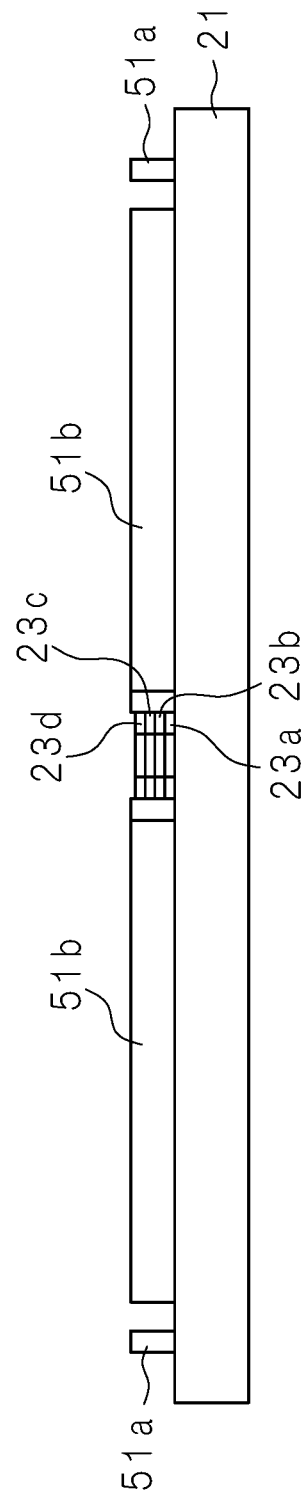

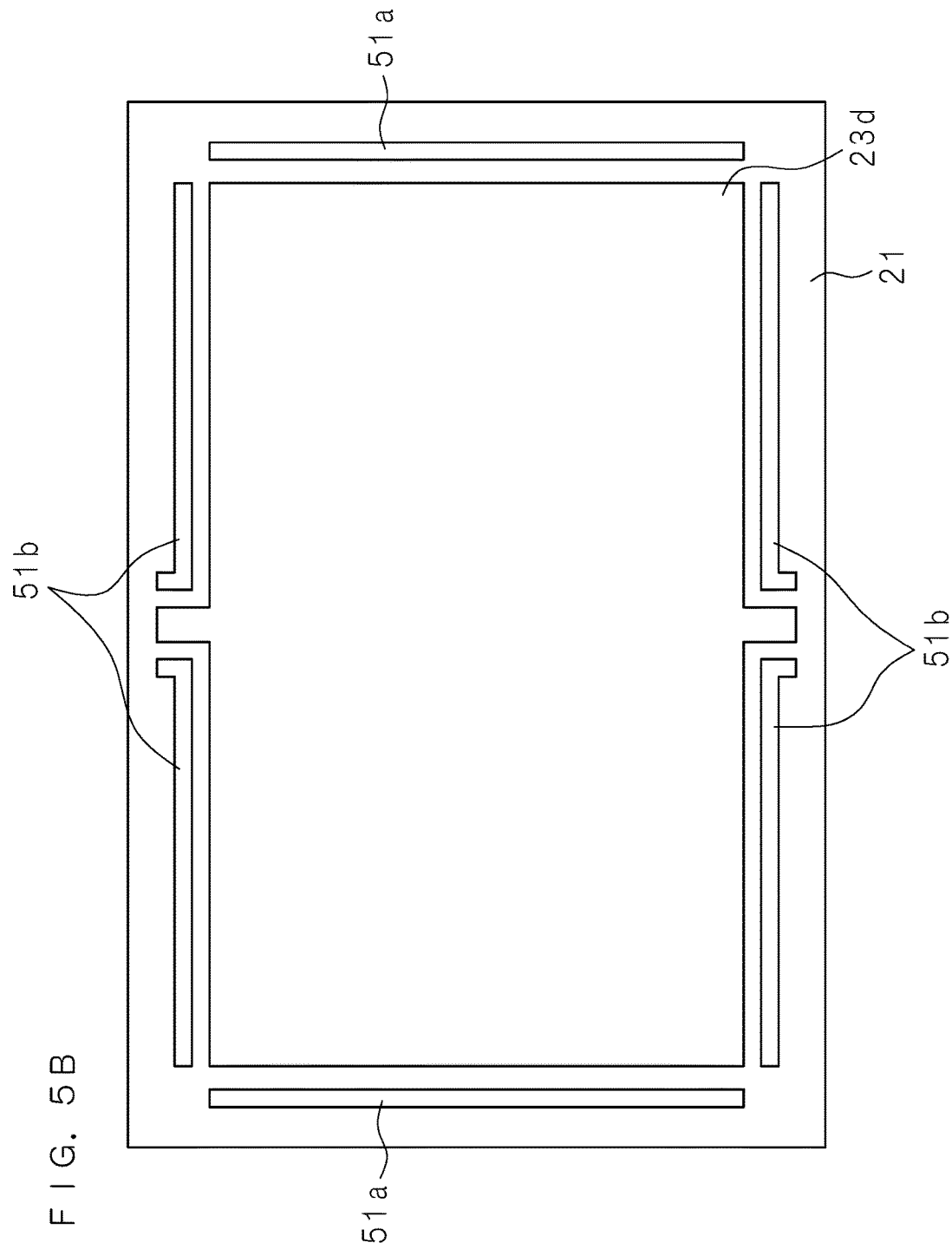

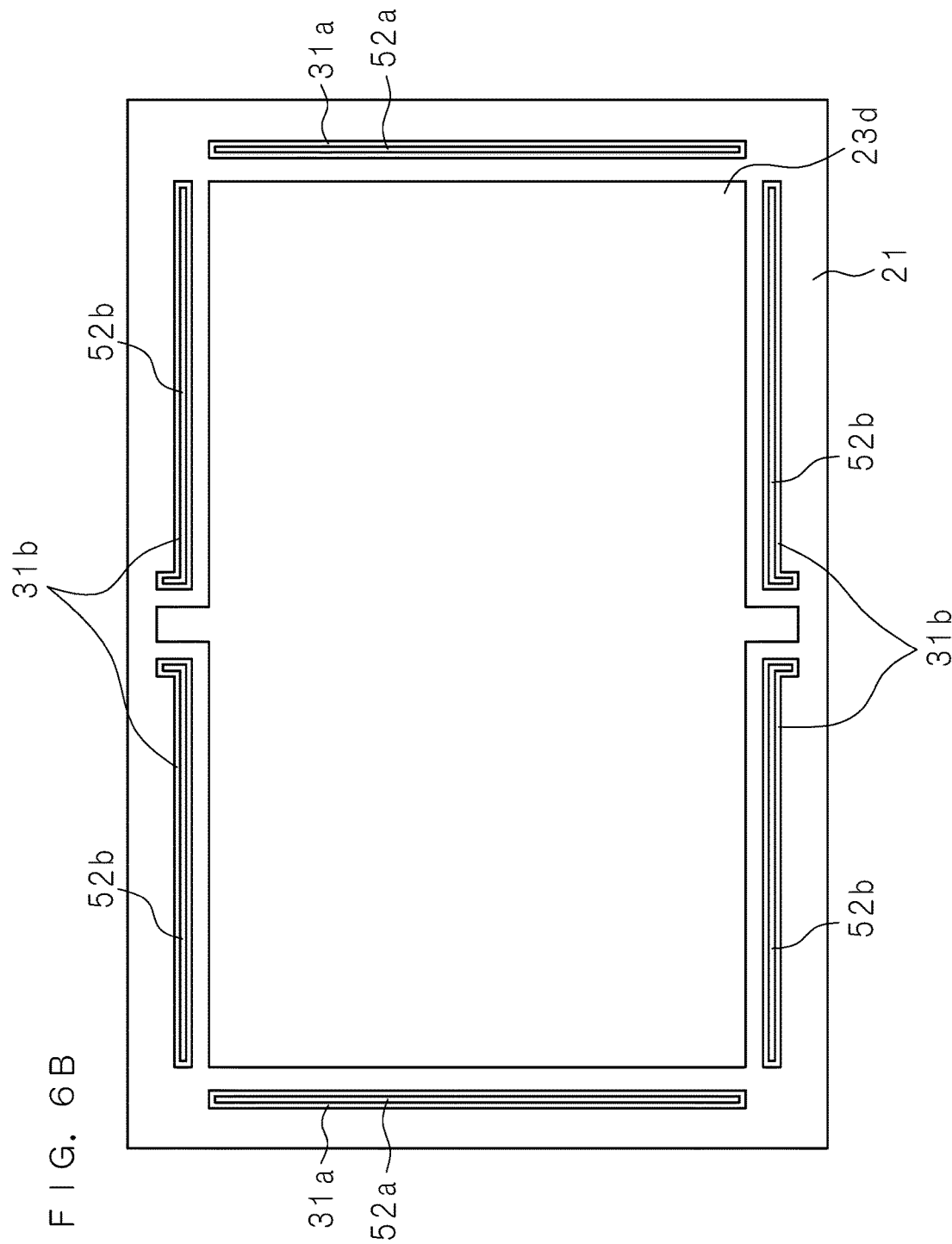

DISPLAY APPARATUS AND METHOD OF MANUFACTURING THE DISPLAY APPARATUS

CROSS-REFERENCE TO RELATED APPLICATIONS

This application is the national phase under 35 U.S.C. § 371 of PCT International Application No. PCT/JP2015/056080 which has International filing date of Mar. 2, 2015 and designated the United States of America.

FIELD

The disclosure relates to a display apparatus and a method of manufacturing the display apparatus.

BACKGROUND

A display apparatus including a liquid crystal panel as an image display unit is configured in such a manner that a backlight is disposed on a rear surface side of the liquid crystal panel, and light emitted from the backlight is modulated and transmitted by the liquid crystal panel so as to display an image on a front surface of the liquid crystal panel. The backlight is broadly divided into a direct type and an edge light type, but in recent years, to reduce power consumption and thin a frame, the edge light type backlight is widely employed.

The edge light type backlight includes a light guide plate and a light source which are housed in a backlight chassis formed in a shallow bottom box shape. The light guide plate is a flat plate made of glass or a translucent resin material, and is placed on a bottom plate of the backlight chassis. The light source is attached to one side wall of the backlight chassis to face one side of the light guide plate. Light emitted from the light source enters the one side of the light guide plate and progresses in the light guide plate, and then the light is distributed and emitted throughout the entirety of one broad surface of the light guide plate which is exposed to an opening side of the backlight chassis.

The display apparatus has a configuration in which the one broad surface of the light guide plate is arranged to face the rear surface of the liquid crystal panel, and optical sheets are interposed between the surfaces facing each other. The optical sheet is an optical element which performs light diffusing and light collecting actions. The light emitted from the light guide plate is irradiated to the liquid crystal panel via the optical sheet.

A display apparatus, in which a spacer is disposed between the light guide plate and the liquid crystal panel and a space for interposing the optical sheets therebetween is secured, has been proposed. For example, in a display apparatus (display module) described in Patent Document 1, a light guide plate and a liquid crystal panel are arranged to face each other at an appropriate interval by a frame-shaped spacer which is provided in peripheral edge parts, and optical sheets are disposed in an inner space defined by the spacer.

In a method of manufacturing the display apparatus of Japanese Patent Laid-open Publication No. 2007-232809, the optical sheets are disposed on one broad surface of the light guide plate, and the spacer is temporarily fixed on the light guide plate by using a double-sided adhesive sheet to surround the optical sheets.

Thereafter, an adhesive is applied to outer peripheries of the spacer, and a display panel is placed on the spacer, and then the adhesive is heated or irradiated with UV rays to cure the same, so as to couple the light guide plate and the liquid crystal panel with each other.

SUMMARY

However, in the method of manufacturing the display apparatus described in Patent Document 1, it is not possible to sufficiently and precisely position the optical sheet in a manufacturing step, and based on the structure described in Patent Document 1, it is difficult to manufacture the display apparatus while precisely positioning the optical sheets.

In consideration of the above-described circumstances, it is an object to provide a display apparatus which facilitates accurate positioning of optical sheets, and a method of manufacturing the display apparatus.

According to an aspect of the present disclosure, there is provided a display apparatus comprises a display panel which displays an image on one surface thereof, a light guide plate disposed to face the other surface of the display panel, a plurality of optical sheets interposed between the display panel and the light guide plate, and a spacer which is sandwiched between the display panel and the light guide plate to secure a space for interposing the optical sheets therebetween, wherein the spacer has a space holding layer fixed to the light guide plate and securing the space, and a fixed layer sandwiched between the display panel and the space holding layer and fixed to the display panel, wherein the thickness of the space holding layer is thicker than a total of the thicknesses of the plurality of optical sheets except for an optical sheet nearest to the display panel.

According to an aspect of the present disclosure, the spacer is separated into the space holding layer and the fixed layer, and the thickness of the space holding layer is thicker than the total of the thicknesses of the plurality of optical sheets except the optical sheet nearest to the display panel.

Therefore, when forming the space holding layer on the light guide plate, and then placing the optical sheets on a light guide plate during manufacturing, the optical sheets are locked to the space holding layer to regulate a movement thereof, such that the optical sheets may be accurately positioned. In addition, the thickness of the space holding layer is set to a minimum thickness adapted to regulate the movement of the optical sheets, such that an increase in the thickness of the display apparatus due to the spacer may be suppressed.

Further, since the thickness of the spacer is secured by the space holding layer, the fixed layer may be thinned. Therefore, the thickness of the spacer may approach the thickness of the space holding layer, and at the time of manufacturing, the thickness of the spacer may be set to be a maximum permissible dimension or less by decreasing an error between an actual thickness thereof and a defined thickness, and a dimensional precision of the spacer may be increased.

In the display apparatus according to another aspect of present disclosure, wherein the thickness of the space holding layer is thicker than the total of the thicknesses of the plurality of optical sheets.

According to another aspect of present disclosure, since the optical sheets are reliably locked to the space holding layer to regulate the movement thereof during manufacturing the display apparatus, the optical sheets may be precisely positioned. In addition, since the thickness of the spacer is secured by the space holding layer, the fixed layer may be thinned. Therefore, the thickness of the spacer may approach the thickness of the space holding layer, and at the time of manufacturing, the thickness of the spacer may be set to be the maximum permissible dimension or less by decreasing the error between the actual thickness thereof and the defined thickness, and the dimensional precision of the spacer may be increased.

In the display apparatus according to another aspect of present disclosure, wherein the thickness of the fixed layer is thinner than the thickness of the space holding layer.

According to another aspect of present disclosure, the thickness of the fixed layer is thinner than the thickness of the space holding layer, thereby the thickness of the spacer may approach the thickness of the space holding layer, and at the time of manufacturing, the thickness of the spacer may be set to be the maximum permissible dimension or less by decreasing the error between the actual thickness thereof and the defined thickness, and the dimensional precision of the spacer may be increased.

In the display apparatus according to another aspect of present disclosure, wherein the fixed layer is made of a material adapted to start curing with the lapse of 1 to 5 minutes after irradiation with UV rays.

According to another aspect of present disclosure, in a manufacturing step of the display apparatus, when irradiating the material of the fixed layer with UV rays, the curing is started with the lapse of 1 minutes in the quickest case. Therefore, sufficient time may be secured in the work when placing the display panel on the material before the above-described material is solidified. In addition, since the curing is started with the lapse of 5 minutes after irradiation with UV rays in the slowest case, the display apparatus may be efficiently manufactured.

According to an aspect of present disclosure, there is provided a method of manufacturing the display apparatus as describe above, comprises: a forming step of forming a space holding layer by coating and solidifying a solidifiable liquid; a laminating step of laminating optical sheets after the forming step; a coating step of coating the space holding layer with the solidifiable liquid after the laminating step; and a placing step of placing the display panel on the liquid before the liquid is solidified.

According to another aspect of present disclosure, the optical sheets are laminated after forming the space holding layer. Thereby, the optical sheets are locked to the space holding layer to regulate the movement thereof, such that the optical sheets may be accurately positioned.

In addition, since the space holding layer is formed by solidification of the liquid, and then the optical sheets are laminated on the light guide plate, it is possible to prevent the optical sheets from coming into contact with the unsolidified liquid and being unintentionally fixed thereto.

In the method of manufacturing the display apparatus according to another aspect of present disclosure, further comprises: pressing step of pressing the liquid crystal panel from the one side before solidification of the liquid after the placing step.

According to another aspect of present disclosure, since the liquid crystal panel is pressed before solidification of the liquid, it is possible to increase a fixing strength of the fixed layer. In addition, by thinly extending the fixed layer, the thickness of the spacer may approach the thickness of the space holding layer. Thereby, at the time of manufacturing, the thickness of the spacer may be set to be the maximum permissible dimension or less by decreasing the error between the actual thickness thereof and the defined thickness, and the dimensional precision of the spacer may be increased.

In the method of manufacturing the display apparatus according to another aspect of present disclosure, wherein the liquid is a UV curable resin.

According to another aspect of present disclosure, the liquid may be easily solidified by irradiation with UV rays.

In the method of manufacturing the display apparatus according to another aspect of present disclosure, wherein the liquid used to coat the space holding layer in the coating step is a material adapted to start curing with the lapse of 1 to 5 minutes after irradiation with UV rays.

According to another aspect of present disclosure, since the curing of the liquid to be coated on the space holding layer in the coating step is started with the lapse of 1 minutes after irradiation with UV rays in the quickest case, it is possible to secure a time required for the coating step and the placing step. Further, since the curing of the liquid is started with the lapse of 5 minutes after irradiation with UV rays in the slowest case, the display apparatus may be efficiently manufactured.

According to an aspect of present disclosure, the optical sheets may be accurately positioned.

The above and further objects and features will more fully be apparent from the following detailed description with accompanying drawings.

BRIEF DESCRIPTION OF THE DRAWINGS

FIG. 3 is a side view illustrating a structure of a spacer.

FIG. 4A is an explanatory view describing a manufacturing process of the display apparatus.

FIG. 5A is an explanatory view describing the manufacturing process of the display apparatus.

FIG. 5B is an explanatory view describing the manufacturing process of the display apparatus.

FIG. 6B is an explanatory view describing the manufacturing process of the display apparatus.

DETAILED DESCRIPTION

Figure 1:
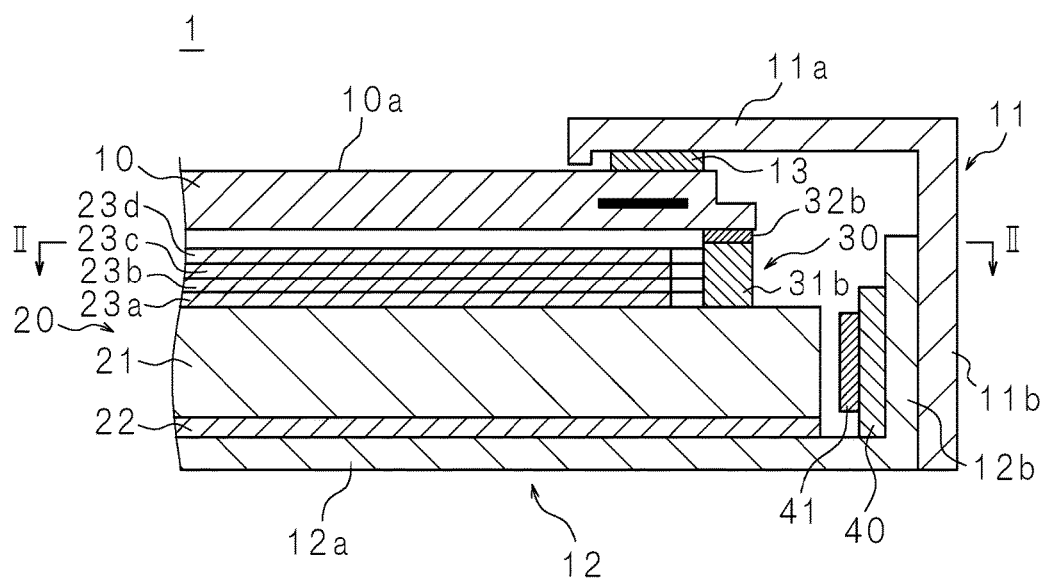
FIG. 1 is a cross-sectional view illustrating major parts of a display apparatus according to Embodiment 1.

Hereinafter, a display apparatus according to embodiments of the present disclosure will be described with reference to the accompanying drawings. FIG. 1 is a cross-sectional view illustrating major parts of a display apparatus 1 according to Embodiment 1. The display apparatus 1 includes a liquid crystal panel 10, a bezel 11, a backlight chassis 12, and a backlight 20.

The liquid crystal panel 10 is formed in a rectangular shape and has a display surface 10a which is a front surface thereof to display an image. In addition, the backlight chassis 12 is disposed on a rear surface side of the liquid crystal panel 10, has a rectangular bottom plate 12a facing the liquid crystal panel 10, and side plates 12b which vertically stand from four sides of the bottom plate toward the liquid crystal panel 10, and is formed in a shallow bottom box shape whose front surface side is open.

The backlight 20 includes a rectangular light guide plate 21 contained in the backlight chassis 12, and a plurality of light sources 41, 41 . . . , arranged to face one side of the light guide plate 21. The light guide plate 21 is a flat plate made of glass or a translucent resin material, and has one broad surface and the other broad surface provided with a dot pattern for scattering light.

The light guide plate 21 is placed on the bottom plate of the backlight chassis 12 through a reflection sheet 22. The other broad surface of the light guide plate 21 comes into contact the reflection sheet 22. In addition, the light sources 41, 41 . . . are aligned to a substrate 40 attached on a side wall of the side plate 12b of the backlight chassis 12 corresponding to the one side of the light guide plate 21.

The one broad surface of the light guide plate 21 is provided with a spacer 30, and the liquid crystal panel 10 is coupled to the light guide plate 21 through the spacer 30. The spacer 30 is fixed to an edge part of a rear surface of the liquid crystal panel 10 and an edge part of the one broad surface of the light guide plate 21.

In addition, four optical sheets 23a, 23b, 23c and 23d, which serve to diffuse light and collect the light, are disposed on the one broad surface of the light guide plate 21. The optical sheets 23a, 23b, 23c and 23d are disposed so as to be sequentially overlapped in a direction in which the liquid crystal panel 10 and the light guide plate 21 face each other. The optical sheet 23d is disposed nearest the liquid crystal panel 10.

By the spacer 30, a space in which the optical sheets 23a, 23b, 23c and 23d are interposed is secured between the liquid crystal panel 10 and the light guide plate 21.

The bezel 11 has a rectangular frame-shaped frame 11a located on the front surface side of the liquid crystal panel 10, and side plates 11b which vertically stand from four sides forming an outer periphery of the frame toward the backlight chassis 12. The bezel 11 is adapted to cover the liquid crystal panel 10 so that the side plates 11b thereof come into contact the side plates 12b of the backlight chassis 12. A peripheral edge part of the display surface 10a is covered by the frame 11a of the bezel 11 with a buffer material 13 therebetween.

Figure 2:
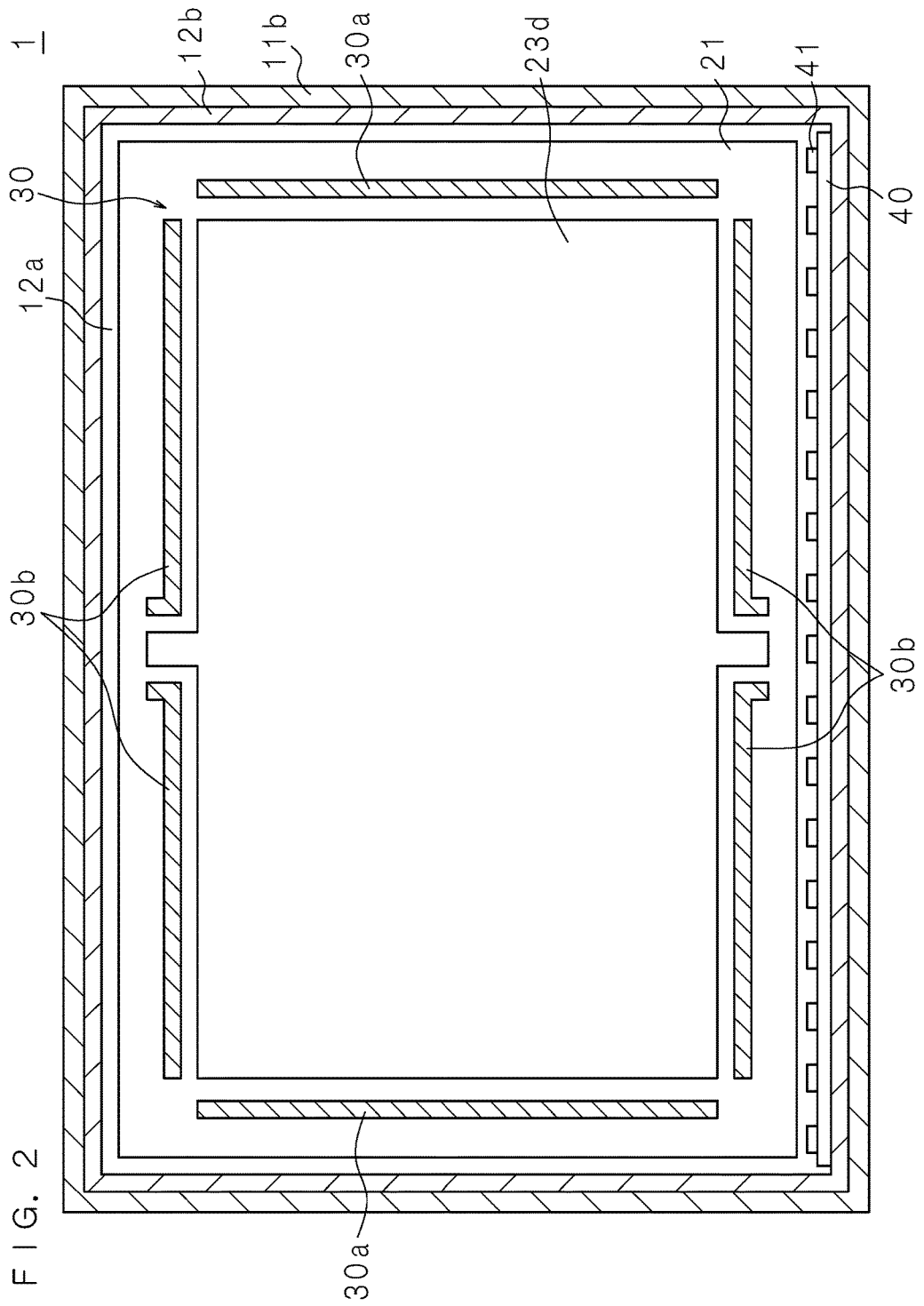
FIG. 2 is a cross-sectional view taken on line II-II in FIG. 1.

FIG. 2 is a cross-sectional view taken on line II-II in FIG. 1, and FIG. 3 is a side view illustrating a structure of the spacer 30. The optical sheets 23a, 23b, 23c and 23d are formed in a rectangular shape and have convex parts at respective central portions of two long sides in a direction parallel to the surface. The optical sheets 23a, 23b, 23c and 23d are disposed in such a manner that the convex parts are aligned on the one broad surface of the light guide plate 21.

As illustrated in FIG. 2, the spacer 30 is formed in a rectangular frame shape along four sides of the light guide plate 21 at the edge parts of the one broad surface of the light guide plate 21, and has two short side spacers 30a and 30a and two long side spacers 30b and 30b.

The long side spacer 30b is separated at a center in a longitudinal direction thereof. In the separated portion, end portions facing each other are bent in an outside direction of the light guide plate 21, respectively. The long side spacer 30b has a void formed by the end portions facing each other.

The optical sheets 23a, 23b, 23c and 23d are disposed in an inner space of the spacer 30. In addition, the respective convex parts of the optical sheets 23a, 23b, 23c and 23d are inserted into the voids of the long side spacers 30b and 30b.

As illustrated in FIG. 3, the short side spacer 30a has a space holding layer 31a fixed to the light guide plate 21 so as to be and a fixed layer 32a fixed to the liquid crystal panel 10 side that are arranged in the direction in which the liquid crystal panel 10 and the light guide plate 21 face each other.

The fixed layer 32a is thinner than the space holding layer 31a, and the fixed layer 32a and the space holding layer 31a are fixed to each other. Similarly, the long side spacer 30b has a space holding layer 31b and a fixed layer 32b. Thicknesses of the space holding layers 31a and 31b are the same as each other, and the thicknesses of the fixed layers 32a and 32b are the same as each other.

The thickness of the space holding layer 31a or 31b is thicker than a total of the thicknesses of the optical sheets 23a, 23b, 23c and 23d, thereby securing a space in which the optical sheets 23a, 23b, 23c and 23d are interposed therebetween.

It is preferable that the space holding layers 31a and 31b, and the fixed layers 32a and 32b are made of a material adapted to start curing with the lapse of 1 to 5 minutes after irradiation with ultraviolet (UV) rays. Thereby, in a manufacturing step of the display apparatus 1, when irradiating the material of the fixed layers 31a and 31b with UV rays, the curing is started with the lapse of 1 minute in the quickest case. Therefore, sufficient time may be secured in the work when placing the liquid crystal panel 10 on the material before the above-described material is solidified. In addition, since the curing is started with the lapse of 5 minutes after irradiation with UV rays in the slowest case, the display apparatus 1 may be efficiently manufactured.

It is preferable that the space holding layers 31a and 31b, and the fixed layers 32a and 32b are made of a material adapted to start curing with the lapse of 1 to 4 minutes after irradiation with UV rays. Thereby, the display apparatus 1 may be more efficiently manufactured.

It is further preferable that the space holding layers 31a and 31b, and the fixed layers 32a and 32b are made of a material adapted to start curing with the lapse of 1 to 3 minutes after irradiation with UV rays. Thereby, the display apparatus 1 may be further efficiently manufactured.

In the display apparatus 1 configured as described above, since the optical sheets 23a, 23b, 23c and 23d are reliably locked to the space holding layers 31a and 31b to regulate a movement thereof, the optical sheets 23a, 23b, 23c and 23d may be precisely positioned. In addition, since the thickness of the spacer 30 is secured by the space holding layers 31a and 31b, the fixed layers 32a and 32b may be thinned.

Therefore, the thickness of the spacer 30 may approach the thickness of the space holding layer 31a or 31b, and at the time of manufacturing, the thickness of the spacer 30 may be set to be a maximum permissible dimension or less by decreasing an error between an actual thickness thereof and a defined thickness, and a dimensional precision of the spacer 30 may be increased.

In addition, since the thickness of the fixed layer 32a or 32b is thinner than the thickness of the space holding layer 31a or 31b, similarly, the dimensional precision of the spacer 30 may be increased.

Hereinafter, an operation of the display apparatus 1 will be described. Light emitted from light sources 41 is incident on the one side of the light guide plate 21, and progresses in the light guide plate 21, and then the light is distributed and emitted throughout the entire one broad surface thereof. The light emitted from the light guide plate 21 is modulated and transmitted by the liquid crystal panel 10 through the light diffusing and light collecting by the optical sheets 23a, 23b, 23c and 23d, so as to display an image on the display surface 10a.

Figure 4B:
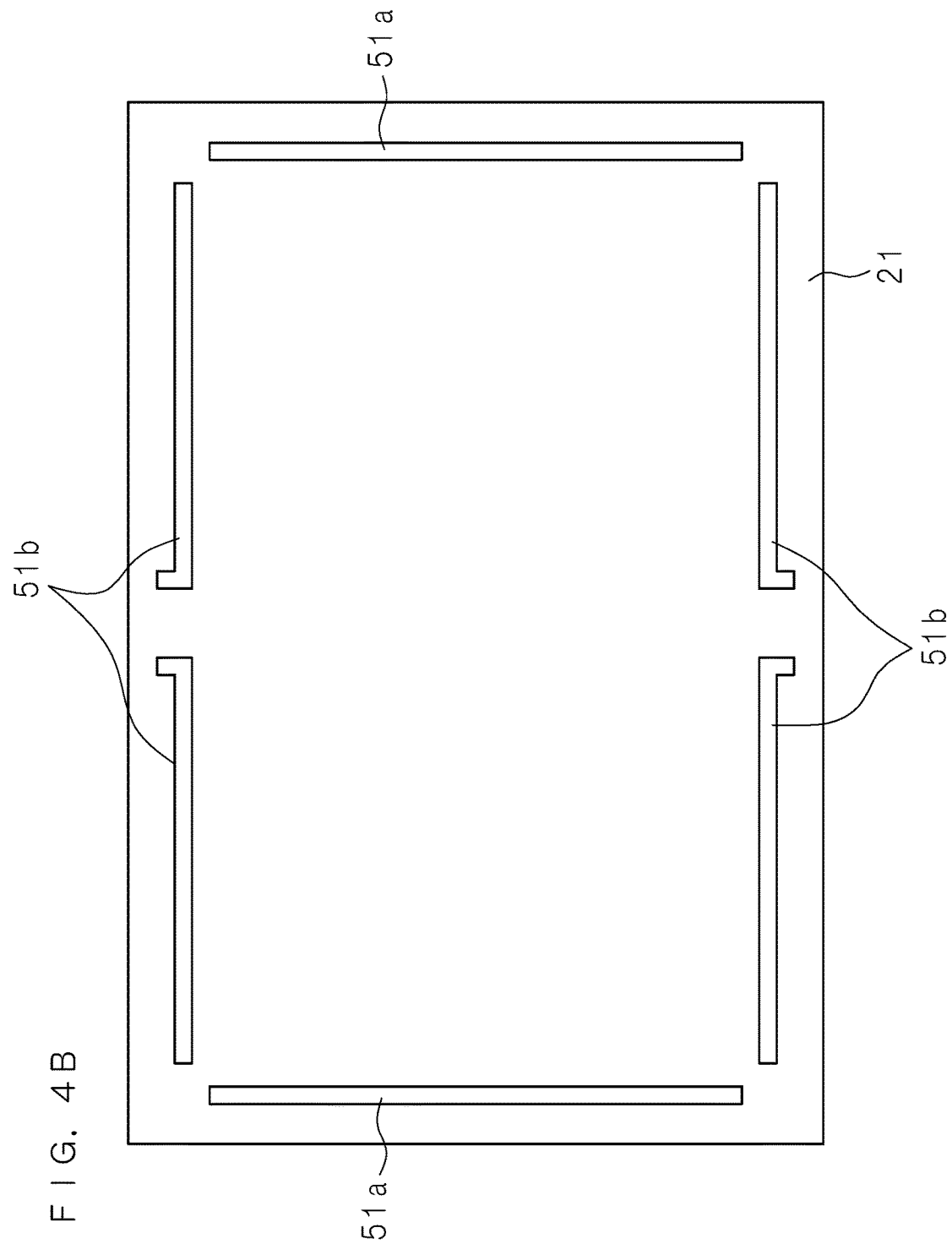
FIG. 4B is an explanatory view describing the manufacturing process of the display apparatus.
Figure 6A:
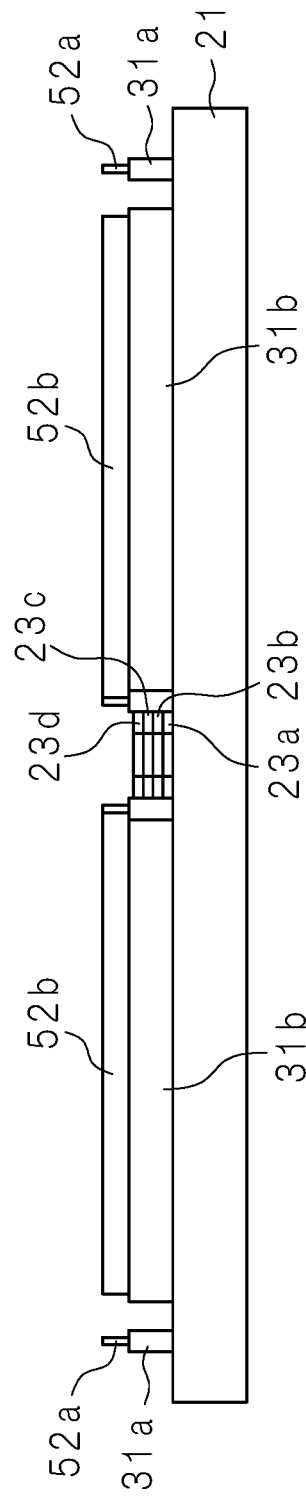
FIG. 6A is an explanatory view describing the manufacturing process of the display apparatus.
Figure 7:
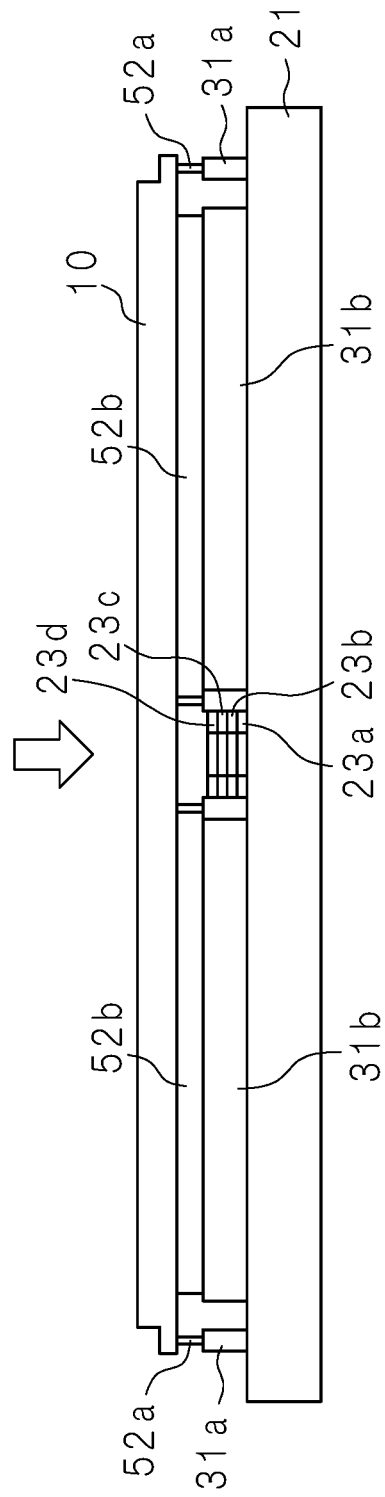
FIG. 7 is an explanatory view describing the manufacturing process of the display apparatus.

Next, a method of manufacturing the display apparatus 1 will be described. FIGS. 4A, 4B, 5A, 5B, 6A, 6B, and 7 are explanatory views describing a manufacturing process of the display apparatus, wherein FIGS. 4A, 5A, 6A and 7 are side views, and FIGS. 4B, 5B and 6B are plan views.

First, as illustrated in FIG. 4A, a liquid resin 50, which is UV curable, is coated on the light guide plate 21 by dropping or applying. After the solidification, the resin 50 is further coated thereon so as to be a thickness of the total of the thicknesses or more of the optical sheets 23a, 23b, 23c and 23d.

The resin 50 is coated along two short sides and long sides of the light guide plate 21. Thereby, two short side resin layers 51a and 51a are provided along the short sides, and two long side resin layers 51b and 51b are provided along the long sides. The long side resin layers 51b and 51b are provided with a void at the central portion thereof, respectively.

The space holding layers 31a and 31a, and 31b and 31b are formed by solidifying the short side resin layers 51a and 51a and the long side resin layers 51b and 51b by irradiation with UV rays.

As illustrated in FIGS. 5A and 5B, after the short side resin layers 51a and 51a and the long side resin layers 51b and 51b are solidified, the optical sheets 23a, 23b, 23c and 23d are laminated on one broad surface of the light guide plate 21. In this case, the short side resin layers 51a and 51a and the long side resin layers 51b and 51b are solidified before the optical sheets 23a, 23b, 23c and 23d are laminated, such that tackiness of the surface is lost.

Therefore, it is possible to prevent the optical sheets 23a, 23b, 23c and 23d from contacting the short side resin layers 51a and 51a and the long side resin layers 51b and 51b before the solidification and being unintentionally fixed thereto. In addition, since the optical sheets 23a, 23b, 23c and 23d are securely locked to the space holding layers 31a and 31b to regulate the movement thereof, the optical sheets may be accurately positioned.

Further, in the lamination of the optical sheets 23a, 23b, 23c and 23d, the respective convex parts are inserted into the voids of the space holding layers 31a and 31a, and 31b and 31b. Thereby, the optical sheets 23a, 23b, 23c and 23d may be accurately positioned.

As illustrated in FIGS. 6A and 6B, after the optical sheets 23a, 23b, 23c and 23d are laminated, the liquid resin 50 is further coated on the space holding layers 31a and 31a, and 31b and 31b by dropping or applying, and thereby, short side resin layers 52a and 52a and the long side resin layers 52b and 52b are provided. Furthermore, before the short side resin layers 52a and 52a and the long side resin layers 52b and 52b are solidified, the liquid crystal panel 10 is placed thereon, then pressed from the surface side thereof as illustrated by an arrow in FIG. 7.

After pressing the liquid crystal panel 10, the short side resin layers 52a and 52a, and the long side resin layers 52b and 52b are solidified by irradiation with UV rays to form the fixed layers 32a and 32a, and 32b and 32b. The substrate 40, on which the light sources 41 are arranged, is attached to the one side wall of the side plate 12b of the backlight chassis 12, and a unit, in which the liquid crystal panel 10 and the light guide plate 21 are coupled with each other, is carried into the backlight chassis 12, and then the bezel 11 is covered and fixed thereto, thus to manufacture the display apparatus 1.

By the above-described method, the spacer 30 is formed, and the liquid crystal panel 10 and the light guide plate 21 are coupled with each other. By using the UV curable resin, the coated resin 50 may be solidified in a short time to form the spacer 30.

In addition, it is possible to increase a fixing strength of the fixed layers 32a and 32b by pressing the liquid crystal panel 10. Further, by thinly extending the fixed layers 32a and 32b, the thickness of the spacer 30 may approach the thickness of the space holding layer 31a or 31b. Thereby, at the time of manufacturing, the thickness of the spacer 30 may be set to be the maximum permissible dimension or less by decreasing the error between the actual thickness thereof and the defined thickness, and the dimensional precision of the spacer 30 may be increased.

It is preferable that the resin 50 making the short side resin layers 52a and 52a, and the long side resin layers 52b and 52b is a material adapted to start curing with the lapse of 1 to 5 minutes after irradiation with UV rays. Since the curing of the resin 50 is started with the lapse of 1 minute after irradiation with UV rays in the quickest case, it is possible to secure the formation of the short side resin layers 52a and 52a and the long side resin layers 52b and 52b, and a time required for placing the liquid crystal panel 10. Further, since the curing of the resin 50 is started with the lapse of 5 minutes after irradiation with UV rays in the slowest case, the display apparatus 1 may be efficiently manufactured.

It is preferable that the resin 50 making the short side resin layers 52a and 52a, and the long side resin layers 52b and 52b is a material adapted to start curing with the lapse of 1 to 4 minutes after irradiation with UV rays. Thereby, the display apparatus 1 may be more efficiently manufactured.

It is preferable that the resin 50 making the short side resin layers 52a and 52a, and the long side resin layers 52b and 52b is a material adapted to start curing with the lapse of 1 to 3 minutes after irradiation with UV rays. Thereby, the display apparatus 1 may be further efficiently manufactured.

It is preferable that the space holding layers 31a and 31b have a thickness of 1300 to 1500 μm, and the fixed layers 32a and 32b have a thickness of 200 μm or less due to the fixing strength of the spacer 30 and the thickness of the display apparatus. In addition, it is preferable that the fixed layers 32a and 32b have a thickness of one-sixth or less of the space holding layers 31a and 31b, respectively.

Moreover, the optical sheets 23a, 23b, 23c and 23d may be configured in such a manner that the convex parts are not provided, respectively. Also in the configuration, the optical sheets 23a, 23b, 23c and 23d may be accurately positioned by the space holding layers 31a and 31b of the spacer 30.

Further, the resin is not limited to the UV curable resin, and may be a moisture-curable or a hot melt type resin, etc. Furthermore, there is no need to continuously form the spacer 30, and for example, the spacer may be configured to be formed in a dots along the respective four sides of the light guide plate 21.

(Embodiment 2)

Hereinafter, a display apparatus 1 according to Embodiment 2 will be described in detail with reference to the accompanying drawings illustrating the embodiment thereof. The same parts of the configuration according to Embodiment 2 as those of the configuration in Embodiment 1 will be denoted by the same reference numerals, and will not be described in detail.

Figure 8:
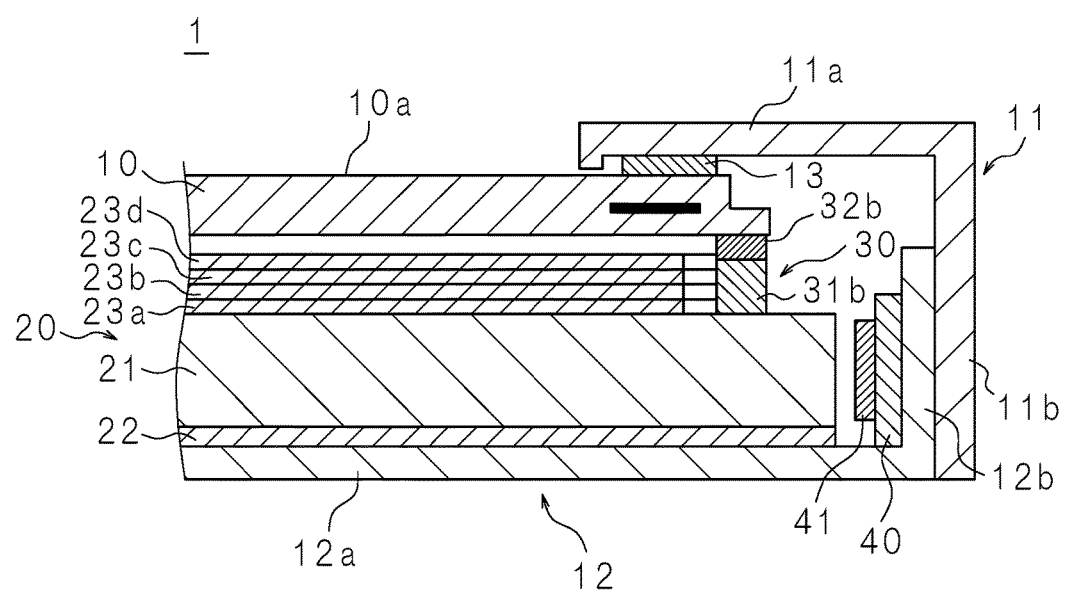
FIG. 8 is a cross-sectional view illustrating major parts of a display apparatus according to Embodiment 2.

FIG. 8 is a cross-sectional view illustrating major parts of a display apparatus 1 according to Embodiment 2. A thickness of space holding layer 31a and 31b is thicker than a total of three optical sheets 23a, 23b and 23c except for an optical sheet 23d nearest to the liquid crystal panel 10, among four optical sheets 23a, 23b, 23c and 23d. In addition, the thickness of the space holding layer 31a and 31b is thinner than a total of the four thicknesses of the optical sheets 23a, 23b, 23c and 23d.

Thereby, the space holding layers 31a and 31b hold the space in which the optical sheets 23a, 23b and 23c are interposed. In addition, the space in which the other optical sheet 23d is interposed is secured by the thickness of the fixed layer 32a or 32b.

The display apparatus 1 according to Embodiment 2 may be manufactured by the same method as in Embodiment 1. In addition, since the optical sheets 23a, 23b, 23c and 23d are locked to the space holding layers 31a and 31a, and 31b and 31b to regulate the movement thereof, the optical sheets may be accurately positioned.

Further, the thickness of the space holding layer 31a is set to a minimum thickness adapted to regulate the movement of the optical sheets 23a, 23b, 23c and 23d, such that an increase in the thickness of the display apparatus 1 due to the spacer may be suppressed.

It is to be noted that, as used herein and in the appended claims, the singular forms "a", "an", and "the" include plural referents unless the context clearly dictates otherwise.

It should be understood that the embodiments disclosed herein are illustrative and non-restrictive in every respect. Since the scope of the disclosed embodiment is defined by the appended claims rather than by the description preceding them, and all changes that fall within metes and bounds of the claims, or equivalence of such metes and bounds thereof are therefore intended to be embraced by the claims. That is, embodiments obtained by combining technical means appropriately modified within the scope defined by the appended claims are also included in the technical scope of the disclosed embodiment.

The invention claimed is:

1. A display apparatus comprising:
   a display panel which displays an image on a front surface thereof;
   a light guide plate disposed to face a back surface of the display panel;
   a plurality of optical sheets interposed between the display panel and the light guide plate; and
   a spacer which is sandwiched between the display panel and the light guide plate to secure a space for interposing the plurality of optical sheets therebetween,
   wherein the spacer has
   a space holding layer, which is formed by coating and solidifying a solidifiable liquid, and is fixed to the light guide plate and securing the space and
   a fixed layer, which is formed by coating and solidifying a solidifiable liquid, and is sandwiched between the display panel and the space holding layer and fixed to the display panel,
   wherein a thickness of the space holding layer is thicker than a total of thicknesses of one or more optical sheets, except for an optical sheet nearest to the display panel among the plurality of optical sheets, and
   the fixed layer is made of a material adapted to start curing with a lapse of 1 to 5 minutes after irradiation with UV rays.

2. The display apparatus according to claim 1, wherein the thickness of the space holding layer is thicker than a total of thicknesses of the plurality of optical sheets.

3. The display apparatus according to claim 1, wherein the thickness of the fixed layer is thinner than the thickness of the space holding layer.

4. A method of manufacturing a display apparatus including a display panel which displays an image on a front surface thereof, a light guide plate disposed to face a back surface of the display panel, a plurality of optical sheets interposed between the display panel and the light guide plate, and a spacer which is sandwiched between the display panel and the light guide plate to secure a space for interposing the plurality of optical sheets therebetween, the spacer having a space holding layer, which is formed by coating and solidifying a solidifiable liquid, and is fixed to the light guide plate and securing the space and a fixed layer, which is formed by coating and solidifying a solidifiable liquid, and is sandwiched between the display panel and the space holding layer and fixed to the display panel, a thickness of the space holding layer being thicker than a total of thicknesses of one or more optical sheets, except for an optical sheet nearest to the display panel, among the plurality of optical sheets, the method comprising:
   a forming step of forming a space holding layer by coating and solidifying a solidifiable liquid;
   a laminating step of laminating optical sheets after the forming step;
   a coating step of coating the space holding layer with the solidifiable liquid after the laminating step; and
   a placing step of placing the display panel on the liquid used to coat in the coating step before the liquid is solidified.

5. The method according to claim 4, further comprising:
   pressing step of pressing the display panel from the front surface side before solidification of the liquid used to coat in the coating step after the placing step.

6. The method according to claim 4, wherein the liquid used to coat in the forming step and the coating step is a UV curable resin.

7. The method according to claim 4, wherein the liquid used to coat the space holding layer in the coating step is a material adapted to start curing with the lapse of 1 to 5 minutes after irradiation with UV rays.

* * * * *